(12) United States Patent
Tanner

(10) Patent No.: US 9,376,647 B2
(45) Date of Patent: Jun. 28, 2016

(54) NATURAL OIL BASED GELS, APPLICATIONS AND METHODS OF PREPARATION

(71) Applicant: Ethox Chemicals, LLC, Greenville, SC (US)

(72) Inventor: James T. Tanner, Greenville, SC (US)

(73) Assignee: Ethox Chemicals, LLC, Greenville, SC (US)

( * ) Notice: Subject to any disclaimer, the term of this patent is extended or adjusted under 35 U.S.C. 154(b) by 6 days.

(21) Appl. No.: 13/776,542

(22) Filed: Feb. 25, 2013

(65) Prior Publication Data

US 2014/0243549 A1   Aug. 28, 2014

Related U.S. Application Data

(60) Provisional application No. 61/603,253, filed on Feb. 25, 2012.

(51) Int. Cl.
| | |
|---|---|
| *C07C 69/52* | (2006.01) |
| *C11C 3/00* | (2006.01) |
| *C09K 8/035* | (2006.01) |
| *C09K 8/68* | (2006.01) |

(52) U.S. Cl.
CPC . *C11C 3/00* (2013.01); *C09K 8/035* (2013.01); *C09K 8/68* (2013.01)

(58) Field of Classification Search
CPC ....................................................... C07C 69/52
USPC ............................................................ 560/196
See application file for complete search history.

(56) References Cited

U.S. PATENT DOCUMENTS

2013/0225859 A1\* 8/2013 Allen et al. ................... 560/196

\* cited by examiner

*Primary Examiner* — Scarlett Goon
*Assistant Examiner* — Sonya Wright
(74) *Attorney, Agent, or Firm* — Joseph T. Guy; Perkins Law Firm, LLC

(57) ABSTRACT

The present invention relates to novel non-aqueous gels of natural oils and their derivatives and provides a novel process for the gelation of natural oils and their derivatives that does not require the addition of gellants or the irreversible heat bodying of the oil. The gels and method of the present invention are applicable to a wide range of natural oils, and the method is easily tailored to provide thermoreversible gels of any desired viscosity. The natural oil based gels of the present invention and the method of their preparation have many advantages over the prior art. The natural oil based gels provided have exemplary properties and find use in a variety of applications.

12 Claims, 6 Drawing Sheets

Alkanolamine reacted with 1 equivalent Diels Alder or Ene Adduct

(iii)

R = Triglyceride, Fatty Acid, Fatty Acid Derivative

Alkanolamine reacted with 2 and 3 equivalents of Diels Alder or Ene Adduct (iv)

R= Triglyceride, Fatty Acid, Fatty Acid Derivative

NATURAL OIL BASED GELS, APPLICATIONS AND METHODS OF PREPARATION

This application claims the priority benefit under 35 U.S.C. section 119 of U.S. Provisional Patent Application No. 61/603,253 entitled "Gelation of Natural Oils Fatty Acids and derivatives" filed on Feb. 25, 2012, and which is in its entirety herein incorporated by reference.

BACKGROUND OF THE INVENTION

Natural oils and their derivatives continue to become increasingly important as alternatives to dwindling supplies of petroleum and also because of the environmental concerns over petroleum based chemical feedstocks. Natural oils such as soybean oil, corn oil, linseed oil etc. have already been utilized as feedstocks for the development of thermoset and thermoplastic materials, fuels, cosmetic ingredients, and many other applications. Gels of petroleum derived hydrocarbons find utility in a number of important industrial applications such as fracturing fluids and viscosifers in the oil field industry. They also find utility as carriers or vehicles in the ink industry and as thickeners in paints and coatings. In addition they have wide utility in the personal care and cosmetic industry. Hydrocarbon gels have traditionally been made by one of two methods. In one method an organometallic gellant, most commonly an aluminum acylate, or other aluminum compound is added to the hydrocarbon with heating in order to solubilize the gellant in the liquid hydrocarbon. Gelation presumably takes place by a mechanism in which the organoaluminum compound forms long polymer chains or aggregates in the hydrocarbon. Another method involves the addition of a thermoplastic resin such as a block copolymer or a polyamide resin to the hydrocarbon with heating in order to dissolve the polymer in the liquid hydrocarbon. Gellation in these systems presumably takes place by either physical crosslinking or chemical crosslinking via hydrogen bonding. To date, these traditional methods used to viscosity or gel petroleum based hydrocarbons have not been successfully applied to natural oils, and thus these natural oil gels have not been widely available as alternatives to hydrocarbon gels.

The primary means for increasing the viscosity or gelation of natural oils has historically been referred to as "heat-bodying" the oil. In this process, unsaturated natural oils are subjected to high temperatures typically 300-340 deg C. in an inert atmosphere in order to promote chemical crosslinking at the sites of unsaturation in the triglyceride oil. This process as described in U.S. Pat. No. 5,122,188 typically results in oils with viscosities in the range 1600-1800 centipoise. In order to obtain higher viscosities, a second type of heat-bodying process is employed in which the high temperature heating is continued until the oil is irreversibly gelled. This intractable gel is then heated at about 340 deg C. with unmodified oil to produce the desired viscosity. It is often necessary to filter insoluble clumps of gelled oil from these blends. In addition, because both of these processes result in irreversible chemical crosslinks between the triglyceride oil chains, it is difficult to maintain precise control of the viscosity. Both of these processes also require rigorous exclusion of oxygen in order to prevent oil degradation and discoloration. It is also not possible to provide hard gels which are thermoreversible by this process.

More recently it has been reported that natural oils have been successfully gelled by using high molecular weight block copolymers that are specifically designed to be compatible with the natural oils. U.S. Pat. No. 7,674,848B2 and U.S. Pat. No. 7,625,967B2 both disclose the gelation of natural oils by combining block copolymers incorporated at various levels into the oil, and then applying heat and shear in order to obtain a homogenous gel. However, there are several disadvantages to this method. The block copolymers used must be specifically designed for compatibility with the particular oil used (apparently one copolymer is not compatible with a broad range of oils); gels of low viscosity are obtained, relative to gels provided by the present invention, even at high loadings (20%) of the block copolymers. Apparently hard clear gels or clear gels that exhibit no flow or tackiness at ambient temperature are difficult to obtain even with high loadings of block copolymer; viscosity is controlled by the styrene content of the block copolymer, requiring a range of different gellants. It should also be recognized that these "natural oil gels" are essentially blends of natural oils with up to 50% loadings of synthetic block copolymers thus reducing the attractiveness of this method from an environmental standpoint.

OBJECTS OF THE PRESENT INVENTION

It is an object of the present invention to provide novel non-aqueous gels of natural oils and their derivatives.

It is an object of the present invention to provide a simple convenient method for obtaining gels of natural oils and their derivatives of any desired viscosity.

It is a further object of the present invention to provide gels of natural oils and their derivatives that are useful as gelled vehicles or carriers in ink applications.

It is a further object of the present invention to provide gels of natural oils and their derivatives that are useful as dispersants for pigments and fillers in coatings and ink applications.

It is a further object of the present invention to provide gels of natural oils and their derivatives that are useful as vehicles or carriers for additives, polymers and propants in oilfield applications.

It is a further object of the present invention to provide gels of natural oils and their derivatives that are useful as additives in oil and water based drilling muds.

It is a further object of the present invention to provide gels of natural oils their derivatives that are useful as lubricants.

It is a further object of the present invention to provide gels of natural oils their derivatives that are useful in personal care and cosmetic applications.

SUMMARY OF THE INVENTION

Figure 1:
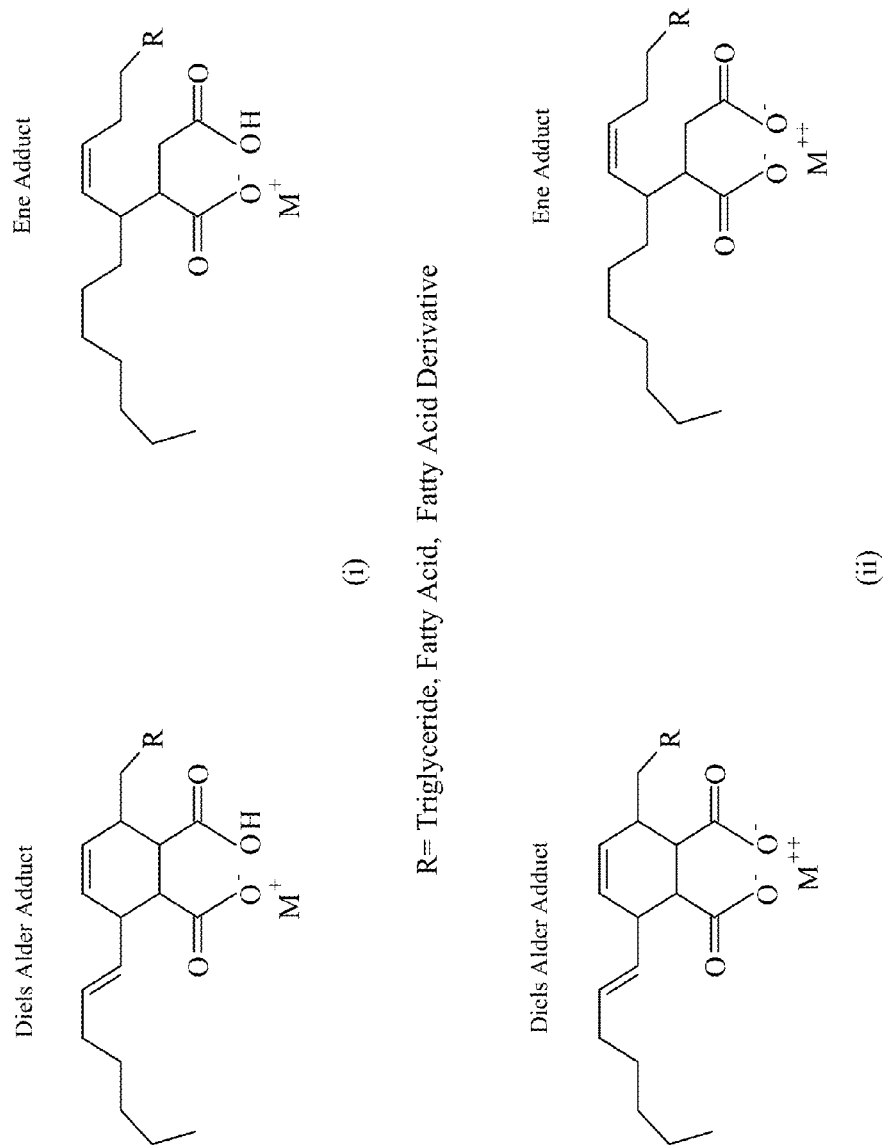
FIG. 1 shows the predominating Diels Alder adducts where the triglyceride or derivative contains conjugated double bonds.

The invention provides natural oil based thermoreversible gels of Formulas (i), (ii), (iii) (iv) and mixtures thereof

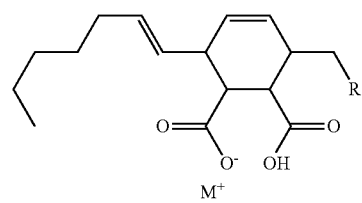

(i)

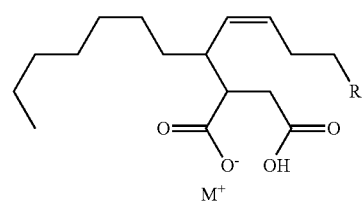

(ii)

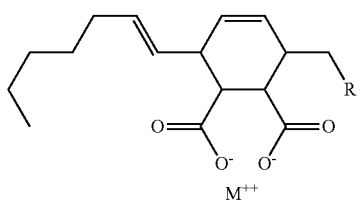

(iii)

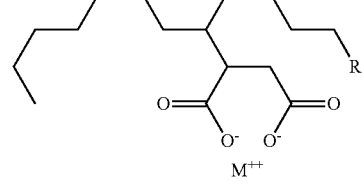

(iv)

where R represents the carbon and functional moieties from said natural oil after undergoing the ene or Diels Alder reaction, M is selected from the group consisting of alkali and alkaline earth metals; wherein the natural oil or natural oil derivative contains greater than about 80 percent of unsaturated or conjugated unsaturated fatty acids that have been reacted with a substrate capable of undergoing an ene or Diels Alder reaction to form an adduct; said adduct being subjected to a reaction with an alkali or alkaline earth metal hydroxide or alkali or alkaline earth metal carbonate base to form an anhydrous thermoreversible ionomeric gel.

The invention also provides natural oil based thermoreversible gels of Formulas (iii) and (iv)

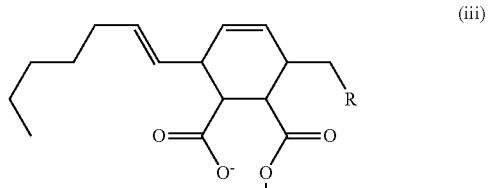

(iii)

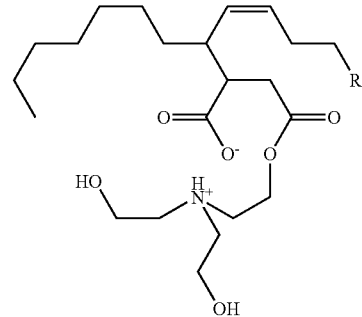

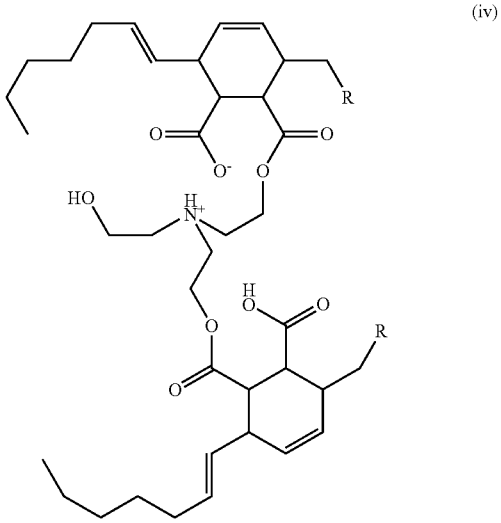

(iv)

-continued

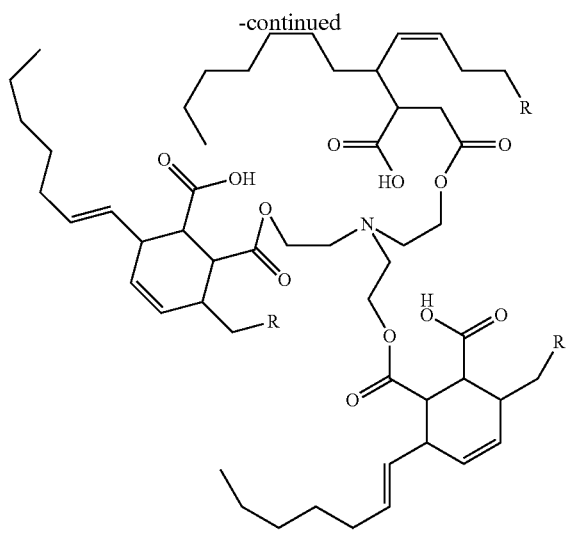

where the natural oil or natural oil derivative contains greater than about 80 percent of unsaturated or conjugated unsaturated fatty acids that have been reacted with a substrate capable of undergoing an ene or Diels Alder reaction to form an adduct that is further esterified and neutralized with an alkanolamine to form a thermoreversible ionomeric gel.

The invention further provides a method for providing thermoreversible gels of natural oils, fatty acids and derivatives thereof said method comprising: (a) reacting a natural oil, fatty acid or derivative with a suitable substrate that is capable of undergoing an "ene" or Diels Alder reaction with said natural oil, fatty acid or derivative to form an adduct; and (b) subjecting said adduct to a controlled non-aqueous neutralization with a suitable inorganic base, where the neutralization is carried out with less than the theoretical stoichiometric amount of base required for complete neutralization.

The invention also relates to a method for providing thermoreversible gels of natural oils, fatty acids and derivatives comprising: (a) reacting a natural oil, fatty acid or derivative with a suitable substrate that is capable of undergoing an "ene" or Diels Alder reaction with said natural oil, fatty acid or derivative to form an adduct; and (b) subjecting said adduct to a controlled esterification/neutralization reaction with an alkanolamine where the amount of alkanol amine reacted is less than the theoretical stoichiometric amount required for complete reaction.

DETAILED DESCRIPTION OF THE PRESENT INVENTION

The present invention provides novel non-aqueous gels of natural oils and their derivatives and a novel method for obtaining such gels. Thermoreversible clear transparent gels of any desired viscosity are conveniently obtained by a simple economical two step process that does not require the addition of gelants or the high temperature "heat bodying" of the oil in order to obtain desirable viscosities. The obtained gels exhibit no "oil bleeding or separation of the oil from the gel which has historically been encountered with known technologies.

In the first step, the unsaturated natural oil or derivative thereof is modified by a process in which the double bonds and/or conjugated double bonds of the triglyceride oil chains are reacted via thermal condensation with an unsaturated substrate which is capable of undergoing an "ene" reaction or an Diels Alder reaction with the sites of unsaturation resulting in the formation of an adduct of the triglyceride oil. The adduct formed is preferentially an anhydride and the substrate reacted in this manner with the triglyceride oil is preferably maleic anhydride. The term "maleation" has been historically applied to the reaction of natural unsaturated oils, fatty acids and their derivatives with maleic anhydride. Functionaliztion of triglyceride oils by this method is well known in the art and is described in U.S. Pat. Nos. 2,033,131, 2,033,132 and 2,063, 540. These adducts are generally referred to in the literature as "maleated oils" or maleinized oils". The aqueous neutralization of these natural oil adducts is also well known in the art to produce soaps, emulsifiers and water-based lubricants.

Applicant has now discovered that the heretofore unreported controlled non-aqueous neutralization of such adducts is a simple convenient method to produce novel non-aqueous gels or "oleogels" of natural oils, fatty acids and their derivatives. This method has proven to be applicable to a wide range of natural unsaturated oils and their derivatives and allows thermoreversible gels of any desired viscosity, from viscous liquids to hard solid gels, to be produced. The method has many advantages over the prior art in that the gels are conveniently and economically produced and do not require the addition of expensive gelants or require the thermal "heat bodying" of the oil. The method of the present invention also allows the water and oil solubility of the gels to be tailored to specific applications, whereas natural oil gels disclosed in prior art are only oil soluble.

While maleic anhydride is the preferred unsaturated substrate for adduct formation due to it's low cost and stability, it is well know to those skilled in the art that any alpha-beta unsaturated molecule capable of undergoing a thermal "ene" reaction or a Diels Alder reaction may be employed. Specific non-limiting examples include itaconic acid, itaconic anhydride, acrylic and methacrylic acid, fumaric acid, citric acid, aconitic acid, citraconic acid, maleimide, maleamic acid and the like.

The natural oils or natural oil derivatives that may be used in the method of the present invention include any triglyceride oil or derivative of such that contains significant portions of unsaturated fatty acids. Natural triglyceride oils containing both non-conjugated and conjugated double bonds are suitable. Non-limiting examples of suitable triglyceride oils include soybean oil, linseed oil, safflower oil, sunflower oil, avocado oil, rapeseed oil, castor oil, tall oil, rosin oil and tung oil. The fatty acids employed in the present invention generally correspond to the fatty acid components of the triglyceride oil and include oleic acid, linoleic acid, linolenic acid, tall oil fatty acid, gadoleic acid, ricinoleic acid and the like.

Derivatives of these fatty acids such as esters, amides etc. may also be used. These include but are not limited to methyl esters, ethyl esters, esters derived from longer chain alcohols, generally $C_4$-$C_{22}$ alcohols, esters derived from polyhydroxy alcohols such as glycerol, diglycerol and polyglycerols, pentaerythritol, dipentaerthyritol, trimethylolpropane, ditrimethylolpropane and the like. Also useful are diesters of glycols such as ethylene glycol, propylene glycol, butylene glycol and the like as well as polyols such as polyethylene glycol, polypropylene glycol, polybutylene glycol and the like.

In one embodiment of the present invention, the adduct obtained in the first step is subjected to a reaction in which the anhydride ring is opened to form a fully or partially neutralized acid salt of the adduct. The neutralization reaction may be carried out in a completely anhydrous manner or the neutralizing agent may be dissolved in a small amount of water in order to decrease the reaction time. In either case, water that is added or formed during the neutralization is completely removed from the reaction mixture to provide an anhydrous ionomeric gel. Removal of the water may be conveniently carried out by simply boiling it off under a nitrogen sparge or vacuum may be applied if desired. While not being bound by any particular theory, it is believed that thermoreversible gelation occurs via the formation of ionomeric or physical crosslinks through reversible ionic aggregation of the metal carboxylate groups formed upon neutralization. Such thermoreversible aggregation of ionic groups is well known in certain polymers but has heretofore been unreported in functionalized natural oils. Depending on the composition of the starting triglyceride oil, fatty acid or derivative, both Diels Alder adducts and/or ene adducts are possible; Diels Alder adducts predominating where the triglyceride or derivative contains conjugated double bonds. (FIG. 1)

The neutralization is preferably carried out by the addition of a suitable base in a quantity sufficient to react with some or all of the anhydride moieties with subsequent formation of the fully neutralized or partially neutralized maleic acid moieties which then results in gel formation. Suitable bases include metal hydroxides such as sodium hydroxide, potassium hydroxide, calcium hydroxide, magnesium hydroxide, lithium hydroxide and the like. Metal carbonate bases such as sodium carbonate, potassium carbonate, calcium carbonate, magnesium carbonate and lithium carbonate and the like may also be used. Tertiary amine bases that form ammonium salts as well as ammonia may also be used. Other tertiary amines are also suitable such as triethylamine, tributylamine, triethylhexylamine and the like. Secondary amines or amines with active hydrogens are generally not preferred as amide formation results.

While the base may be added in an amount just sufficient to neutralize the maleic acid moieties, it is not necessary or generally desirable to fully neutralize both of the maleic acid groups in order to produce sufficient gelation of the oil. It is generally desirable to add less than the theoretical amount of base required to fully neutralize the anhydride/acid functionality. This avoids undesirable saponification of the triglyceride oils or ester linkages which results in soap formation and creates haze in the desired transparent gel. The temperature at which the base is added is also critical, the preferred temperature range being from about 50° C. to about 100° C., and most preferably from about 60° C. to about 80° C. When metal bases such as sodium carbonate are used, it is generally desirable to add them in the solid form but they may also be added as water slurries provided the excess water is removed by vacuum at the end of the neutralization reaction. Sodium and potassium carbonate are preferred over sodium and potassium hydroxide as the hydroxides tend to saponify the triglyceride to some extent resulting in undesirable soap formation. Lithium hydroxide is preferred over lithium carbonate since saponification is not significant with the weaker base.

Depending on the desired viscosity, the preferred level of neutralization is from about 10 to about 100 percent, and more preferably from about 20 to about 60 percent of the theoretical amount of base based on the mole percent of maleic or other adduct in the triglyceride oil. Higher levels of neutralization are generally not necessary to produce sufficient gelation of the oil. At maleation levels of 12 to 14 percent it is generally not necessary to neutralize beyond 50 percent of the theoretical amount based on the mole percent of maleic or other adduct in the triglyceride oil in order to obtain hard gels. The remaining acid functionality may be further neutralized to render the gel soluble in water or left uneutralized. This method allows gels to be produced that have the unique property of being both oil and water soluble.

Another advantage of the method of the present invention over the prior art is that the viscosity of the gels may be precisely controlled. The viscosity of the gels of the present invention is dependant upon the level of maleation of the natural oil or derivative and also the level of neutralization. For a given level of maleation, the viscosity increases as the level of neutralization increases. For a given level of neutralization, the viscosity increases as the level of maleation increases. Thus a high level of maleation combined with a low level of neutralization produces more oil soluble hard gels, whereas a lower level of maleation combined with a higher level of neutralization produces more water soluble hard gels.

In a second embodiment of the present invention, the maleated or otherwise functionalized natural oil is reacted in a second step with an alkanolamine or an alkoxylated alkanolamine in an esterification/neutralization reaction that results in themoreversible gel formation. Non-limiting examples of alkanolamines include monoethanolamine, diethanolamine, triethanolamine, alkoxylated derivatives thereof and the like. The preferred alkanolamine is triethanolamine. As with alkali and alkaline earth metal bases, it is generally desirable to use less than the stoichimetric amount required to fully neutralize and/or esterify the maleic anhydride functionality. Preferably, the amount of alkanolamine or alkoxylated alkanolamine is generally between 10 and 100% of the theoretical molar amount required to react with the maleic or other adduct moieties, and most preferably between 10 and 60% of the theoretical amount depending on the desired viscosity.

Figure 2:
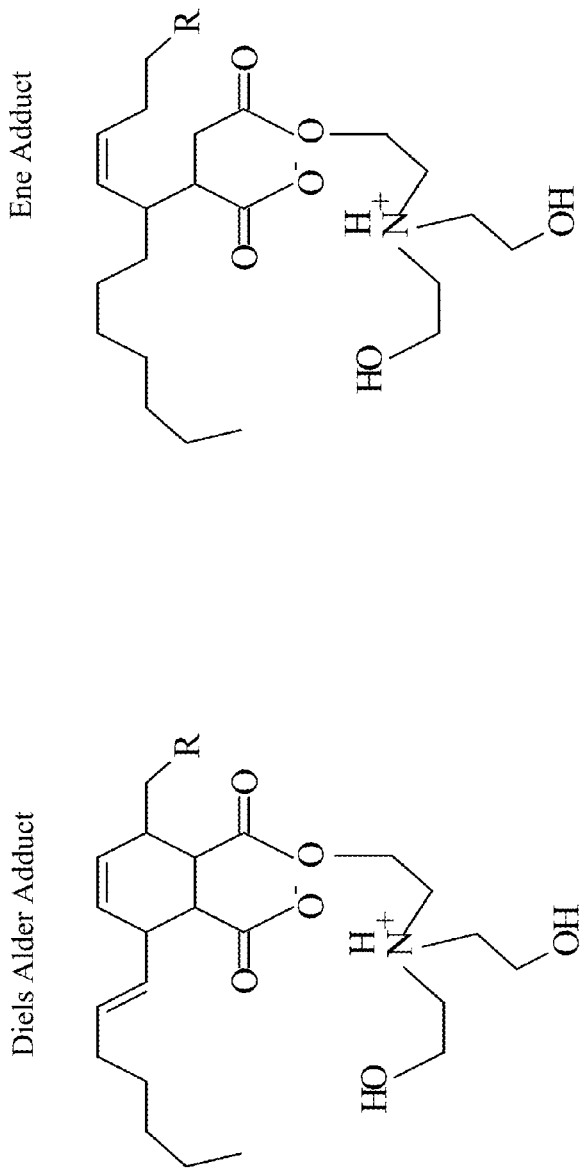
FIG. 2 illustrates the structures derived from alkanolamine or alkoxylated alkanolamine to the maleic or other adduct moieties that are possible.

With alkanolamines, both an esterification of the maleic anhydride moieties occurs along with a concurrent neutralization of the same or another maleic acid moiety. Depending upon the ratio of alkanolamine or alkoxylated alkanolamine to the maleic or other adduct moieties, a mixture of different structures is possible (FIG. 2).

Figure 3:
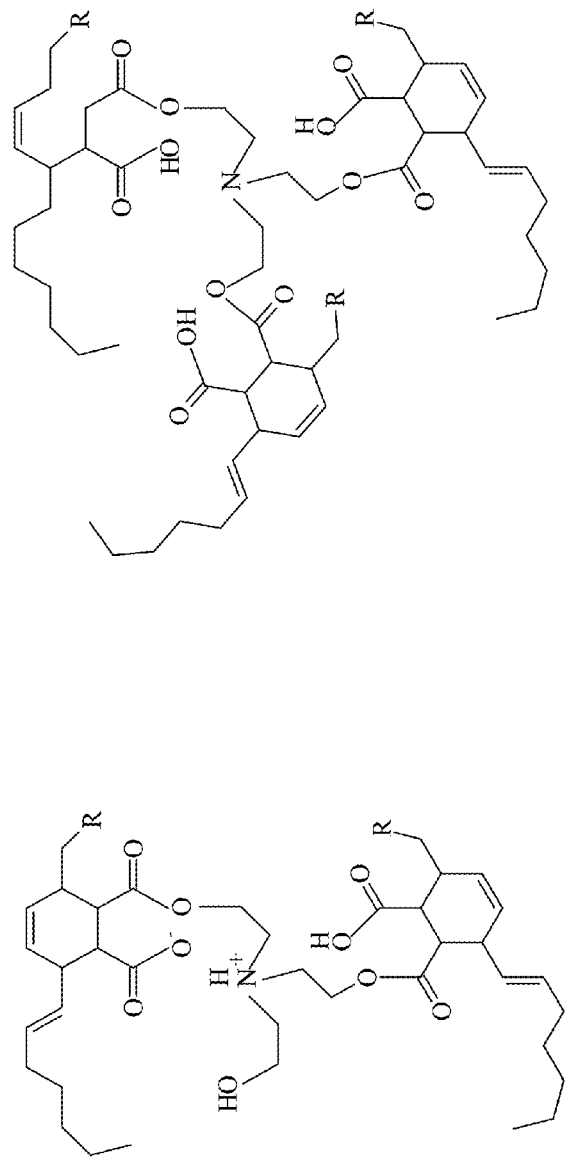
FIG. 3 shows the structures of esterified products of the invention depending on the ratio of adduct to alkanolamine or alkoylated alkanolamine.

As will be recognized by one skilled in the art, one, two or all of the hydroxyl groups on the alkanolamine or alkoxylated alkanolamine may be esterified depending on the ratio of adduct to alkanolamine or alkoylated alkanolamine (FIG. 3).

Again both Diels Alder and/or ene adducts are possible; Diels Alder adducts predominating where the triglyceride or derivative contains conjugated double bonds.

The use of alkoxylated alkanolamines allows control of the water and oil solubility of the gels; the more water soluble ethylene oxide derivatives being more hydrophilic, and the more oil soluble alkylene oxide derivatives such as the propylene oxide and butylene oxide derivatives being more lipophilic. Thus the gels of the this embodiment of the present invention may be modified and tailored for use in both water and oil based systems providing a substantial improvement over the prior art wherein the gels disclosed had only oil solubility.

The temperature at which the alkanolamine is added is not critical but it is generally desirable to maintain the addition temperature between 50 and 120° C., and most preferably between 50 and 80° C. The reaction temperature only need be sufficient to affect the ring opening of the maleic anhydride moieties. The reaction time is not critical but it is generally preferred to maintain the reaction for 1 to 2 hours or until the reaction is complete as indicated by the absence of the anhydride band in the IR spectrum.

The following examples are intended to demonstrate the usefulness of preferred embodiments of the present invention and should not be considered to limit its scope or applicability in any way.

Examples 1-10

The following general method was used to prepare the natural oil gels listed in Table 1. In a first step, 2000 g of the natural oil and the desired amount of maleic anhydride were charged to a 3 L four-neck round-bottom flask. The contents of the flask were gradually heated to 210° C. with agitation under a nitrogen sparge. The reaction mixture was held at this temperature until no free maleic anhydride was detected in the reaction mixture by GC analysis. The reaction mixture was cooled to 50° C. and an amount of Sodium Carbonate (0.25 eq. per eq. maleic anhydride) was slowly added. The Sodium Carbonate could be added as a solid or as a water slurry. The reaction mixture was held at 60° C. until all of the Sodium Carbonate had reacted and the reaction mixture had cleared. Excess water was stripped out under vacuum and the gel obtained was discharged. The gels obtained had exemplary properties, being clear and transparent and exhibited no oil bleed.

The properties of the gels in Table 1 also demonstrate the versatility of the method of the present invention and illustrate several advantages over the prior art. 1) Relatively low levels of modification of the natural oil are required; the resulting final gels being composed of 86-93% natural oil whereas the gels reported in U.S. Pat. No. 7,674,848 require addition of between 20 and 50 wt. % addition of a synthetic block copolymer in order to obtain hard gels. 2) Hard gels exhibiting

TABLE 1

Properties of Maleated Triglycedride Oils/Sodium Carbonate Neutralized

| Example | Percent Maleic Anhydride | Clarity | Oil Bleed | Viscosity (cP) |
|---|---|---|---|---|
| 1) Soybean Oil | 7.5 | Transparent | None | 1000 |
| 2) Soybean Oil | 10 | Transparent | None | 18000 |
| 3) Soybean Oil | 12 | Transparent | None | Hard Gel (no Tack) |
| 4) Linseed Oil | 7.5 | Transparent | None | 5000 |
| 5) Linseed Oil | 10 | Transparent | None | 80000 |
| 6) Linseed Oil | 12 | Transparent | None | Hard Gel (no Tack) |
| 7) Safflower Oil | 10 | Transparent | None | 20000 |
| 8) Safflower Oil | 14 | Transparent | None | Hard Gel (no Tack) |
| 9) Avocado Oil | 12 | Transparent | None | 15000 |
| 10) Sunflower Oil | 14 | Transparent | None | Hard Gel (no tack) | no tackiness are easily obtained whereas such gels are difficult to obtain by the methods disclosed in the prior art. 3) The natural oil gels described in U.S. Pat. No. 7,674,848 require different gellants depending upon the natural oil used, whereas the method of the present invention is applicable to a wide range of natural oils and their derivatives. 4) The method of the present invention allows precise control of the viscosity of the gel by simply varying the amount of maleic anhydride or other moiety grafted on to the natural oil or by varying the amount of neutralizing agent, Example 11, (FIG. 4)

Example 11

Figure 4:
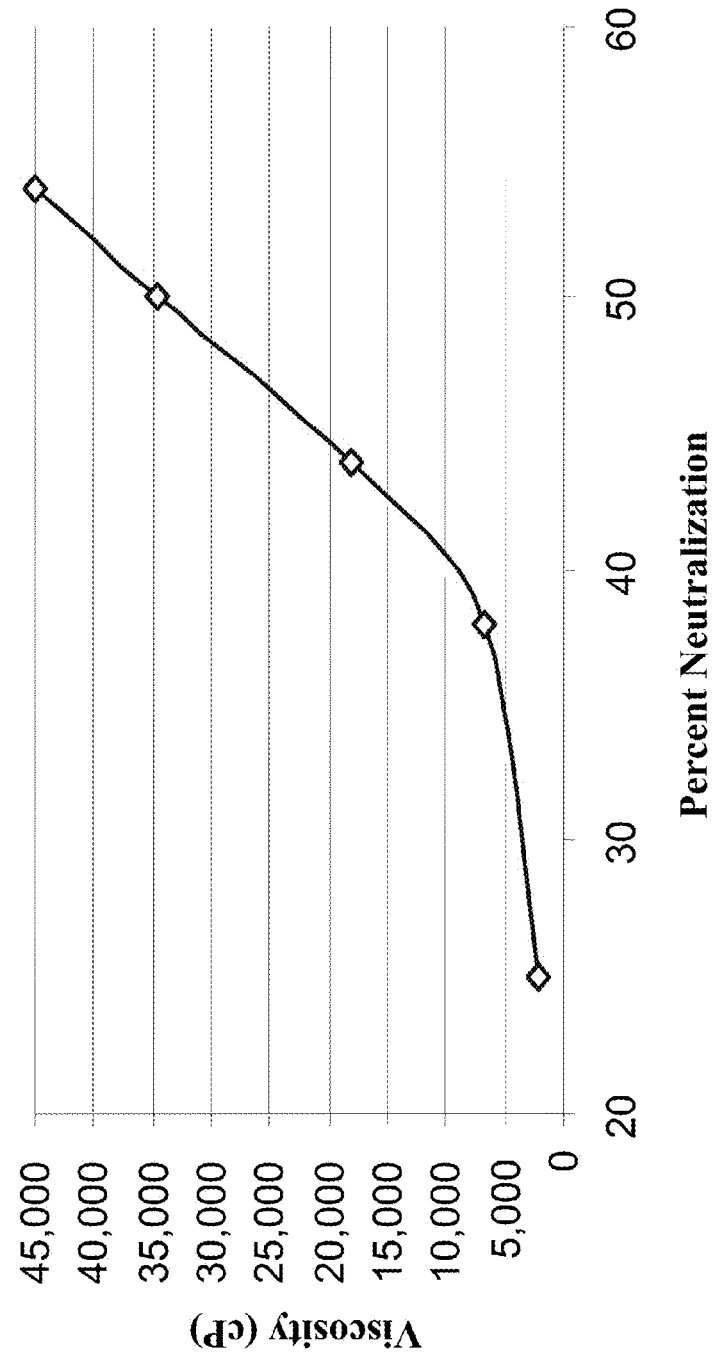
FIG. 4 illustrates the usefulness of the method of the present invention for producing natural oil gels of any desired viscosity by varying the amount of neutralization of the maleic anhydride moieties.

FIG. 4 demonstrates the usefulness of the method of the present invention for producing natural oil gels of any desired viscosity by varying the amount of neutralization of the maleic anhydride moieties. Such precise viscosity control is difficult if not impossible by methods of the prior art.

Examples 12-18

The following method was used to prepare the natural oil gels in Table 2. In a first step, 2000 g of the natural oil and the desired amount of maleic anhydride were charged to a 3 L four-neck round-bottom flask. The contents of the flask were gradually heated to 210° C. with agitation under a nitrogen sparge. The reaction mixture was held at this temperature until no free maleic anhydride was detected in the reaction mixture by GC analysis. The reaction mixture was cooled to 50° C. and the desired amount of solid Lithium Hydroxide was added. The reaction mixture was heated at 125-140° C. until the reaction mixture had cleared. Vacuum may be applied to remove excess water but is not necessary. The gels obtained had exemplary properties being clear and transparent and exhibited no oil bleed or undissolved saponified triglyceride.

TABLE 2

Properties of Maleated Triglyceride Oils/Lithium Hydroxide Neutralized

| Example | % Maleic Anhydride | Clarity | Oil Bleed | Viscosity (cP) |
|---|---|---|---|---|
| 12) Soybean Oil | 7.5 | Transparent | None | 1200 |
| 13) Soybean Oil | 10 | Transparent | None | 40000 |
| 14) Soybean Oil | 12 | Transparent | None | Soft Gel (Tacky) |
| 15) Soybean Oil[b] | 14 | Transparent | None | Hard gel (No tack) |
| 16) Linseed Oil | 10 | Transparent | None | 80000 |
| 17) Linseed Oil | 12 | Transparent | None | Soft Gel (Tacky) |
| 18) Linseed Oil[b] | 14 | Transparent | None | Hard gel (No tack) |
| 19) Safflower Oil | 10 | Transparent | None | 70000 |
| 20) Safflower Oil[b] | 14 | Transparent | None | Hard gel (No tack) |
| 21) Avacodo Oil | 12 | Transparent | None | Soft Gel (Tacky) |
| 22) Sunflower Oil[b] | 14 | Transparent | None | Hard gel (No tack) | a (0.25 eq: 1.0 eq. Maleic Anhydride)
[b](0.5 eq: 1.0 eq. Maleic Anhydride)

Examples 23-34

The following general method was used to prepare the natural oil gels listed in Table 3. In a first step, 2000 g of the natural oil and the desired amount of maleic anhydride were charged to a 3 L four-neck round-bottom flask. The contents of the flask were gradually heated to 210° C. with agitation under a nitrogen sparge. The reaction mixture was held at this temperature until no free maleic anhydride was detected in the reaction mixture by GC analysis. The reaction mixture was cooled to 90° C. and triethanolamine or an alkoxylated triethanolamine (0.67 eq. per 1.0 eq. maleic anhydride) was slowly added. The reaction mixture was held at 80° C. for 1 hour or until no unreacted maleic anhydride was observed in the Infrared Spectrum of the reaction mixture and the gel obtained was discharged.

The properties of the gels in Table 3 also demonstrate the versatility and advantages of this embodiment of the method of the present invention over the prior art.

TABLE 3

| Example | % Maleic Anhydride | Clarity | Oil Bleed | Viscosity (cP) |
|---|---|---|---|---|
| 23) Soybean Oil | 7.5 | Transparent | None | 6000 |
| 24) Soybean Oil[a] | 10 | Transparent | None | 80000 |
| 25) Soybean Oil | 12 | Transparent | None | Hard Gel (no Tack) |
| 26) Linseed Oil | 10 | Transparent | None | 130000 |
| 27) Linseed Oil | 12 | Transparent | None | Hard Gel (no Tack) |
| 28) Safflower Oil | 10 | Transparent | None | 130000 |
| 29) Safflower Oil | 12 | Transparent | None | Soft Gel (Tacky) |
| 30) Avocado Oil | 12 | Transparent | None | Soft Gel (Tacky) |
| 31) Sunflower Oil | 12 | Transparent | None | Soft Gel (Tacky) |
| 32) Sunflower Oil | 16 | Transparent | None | Hard Gel (no Tack) |

TABLE 3-continued

| Example | % Maleic Anhydride | Clarity | Oil Bleed | Viscosity (cP) |
|---|---|---|---|---|
| 33) Soybean Oil | 16 | Transparent | None | Hard Gel (no Tack) |
| 34) Safflower Oil | 16 | Transparent | None | Hard Gel (no Tack) |

<sup>a</sup>Triethanolamine propoxylated with 30 moles propylene oxide

Example 35

Figure 5:
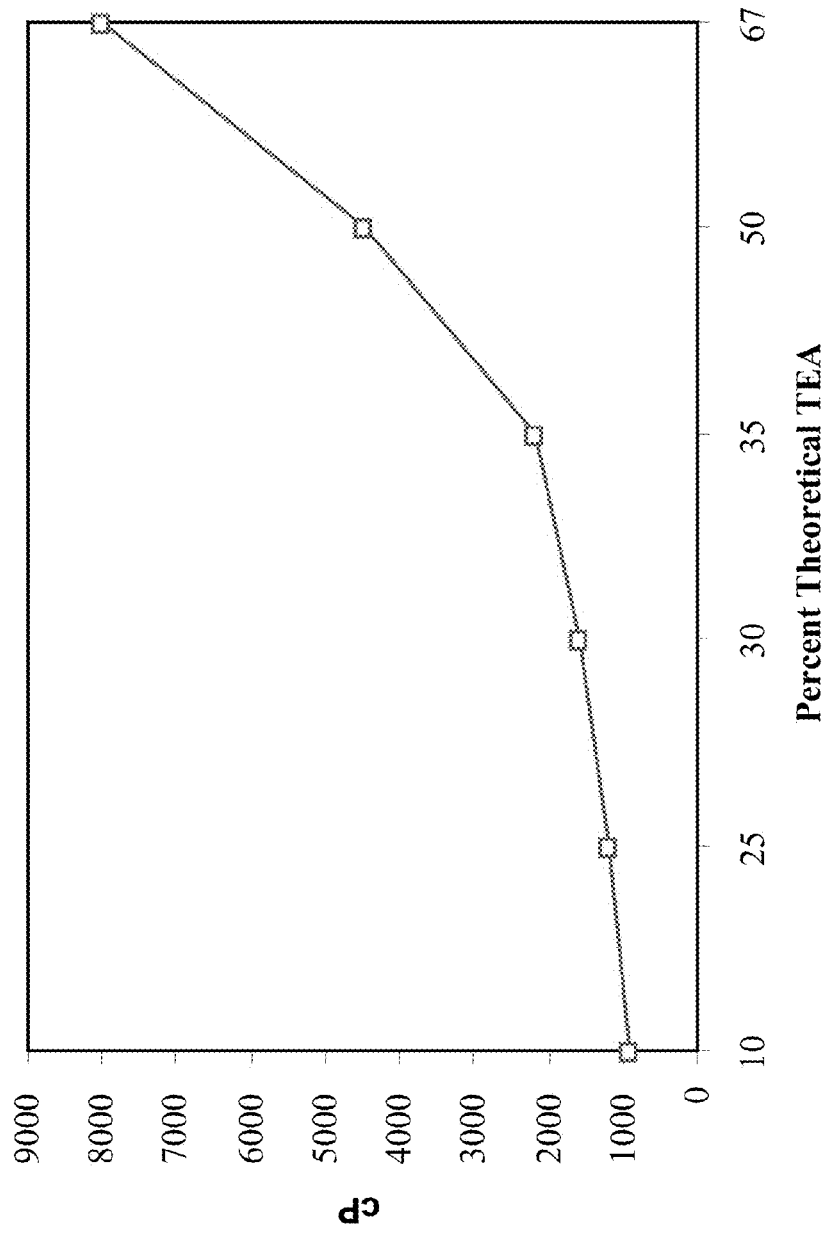
FIG. 5 shows the usefulness of the method of the present invention for producing natural oil gels of any desired viscosity by varying the amount of esterification/neutralization of the maleic anhydride moieties with Triethanolamine at a given level of maleation of the natural oil.

FIG. 5 demonstrates the usefulness of the method of the present invention for producing natural oil gels of any desired viscosity by varying the amount of esterification/neutralization of the maleic anhydride moieties with Triethanolamine at a given level of maleation of the natural oil.

Examples 36-42

The examples in Table 5 illustrate the utility of the method of the present invention in the preparation of gels of derivatives of natural oils. It should be understood that these examples are illustrative of the applicability of the method of the present invention and should not be construed to limit the scope and applicability of the method in any way.

The following general method was used to prepare the natural oil gels listed in Table 5. In a first step, 2000 g of the natural oil derivative and the desired amount of maleic anhydride were charged to a 3 L four-neck round-bottom flask. The contents of the flask were gradually heated to 210° C. with agitation under a nitrogen sparge. The reaction mixture was held at this temperature until no free maleic anhydride was detected in the reaction mixture by GC analysis. The reaction mixture was cooled to 50° C. and the desired amount of base or alkanolamine was slowly added. The reaction mixture was held at 80° C. for 1 hour or until no unreacted maleic anhydride was observed in the Infrared spectrum of the reaction mixture and the gel obtained was discharged.

TABLE 5

Properties of Gelled Natural Fatty Acid and Fatty Acid Esters

| Example | Percent Maleic Anhydride | Clarity | Oil Bleed | Viscosity (cP) |
|---|---|---|---|---|
| 36) Soy Methyl Ester | 10 (TEA neutralized) (0.70 eq) | Transparent | None | 2000 |
| 37) Linseed Fatty Acid Ethyl Ester | 12 (NaOH neutralized) (0.50 eq.) | Transparent | None | 4500 |
| 38) Oleic Acid 2-Ethylhexyl Ester | 12 (TEA neutralized) (0.67 eq.) | Transparent | None | 1500 |
| 39) Linseed Fatty Acid PEG 1000 Diester | 12 (NaOH neutralized) (0.50 eq.) | Transparent | None | 25000 |
| 40) Linseed Fatty Acid Glycerol Triester | 12 (TEA neutralized) (0.67eq.) | Transparent | None | 30000 |
| 41) Linseed Fatty Acid | 12 (NaOH neutralized) (0.70 eq.) | Transparent | None | 1500 |
| 42) Oleic Acid | 12 (TEA neutralized) (0.67eq.) | Transparent | None | 1800 |

Examples 43-48

The following examples are intended to illustrate the particular usefulness of the novel gels of the present invention in a variety of applications and should not construed to limit the scope of their applicability or usefulness in anyway.

Biodegradable Natural Oil Based Gelled Ink Vehicle

Soybean oil gels of different viscosities as prepared in examples 1-13 and examples 23-25 were utilized as a carrier for the preparation of stable polytetrafluorethylene dispersions. Such dispersions are known in the art to be useful as additives in non-aqueous ink formulations to provide friction reduction and abrasion resistance to the final prints. The dispersions were prepared by mixing micronized PTFE into the gelled soybean oil at 80° C. for 1 hour, allowing the mixtures to cool and then discharging. Dispersions were prepared at 25% and 75% PTFE loading. Control dispersions were made using a standard soy based alkyd resin. The dispersions were then aged at 50° C. in order to evaluate dispersion stability. The additives based on the soybean oil gels and the control alkyd were then formulated into a pigmented ink and prints were prepared. The prints were dried and then subjected to abrasion resistance testing. The results are shown in Table 6.

TABLE 6

| Vehicle/Viscosity (cP) | Percent PTFE | Dispersion Stability c | Print Rub Resistance d |
|---|---|---|---|
| 43) Soybean Oil Gel (9000 cP) | 25 | 6 | 6 |
| 44) Soybean Oil Gel (9000 cP) | 75 | 5 | 6 |
| 43) Soybean Oil Gel (15000 cP) | 25 | 8 | 8 |
| 44) Soybean Oil Gel (15000 cP) | 75 | 7 | 8 |
| 43) Soybean Oil Gel (20000 cP) | 25 | 10 | 10 |
| 44) Soybean Oil Gel (20000 cP) | 75 | 10 | 10 |
| 45) Soy based Alkyd (9000 cP) | 25 | 4 | 4 |
| 45) Soy based Alkyd (9000 cP) | 75 | 4 | 4 | c Dispersion Stability was evaluated by ageing samples at 50° C. for 72 hours and monitoring the amount of PTFE that had settled. The dispersions were rated on a scale from 1-10. 1 being the worst stability and 10 the best.
d The rub resistance of the prints was rated on a scale from 1-10 with 1 being the worst rub resistance and 10 the best.

Example 46

Clay Dispersions

Figure 6:
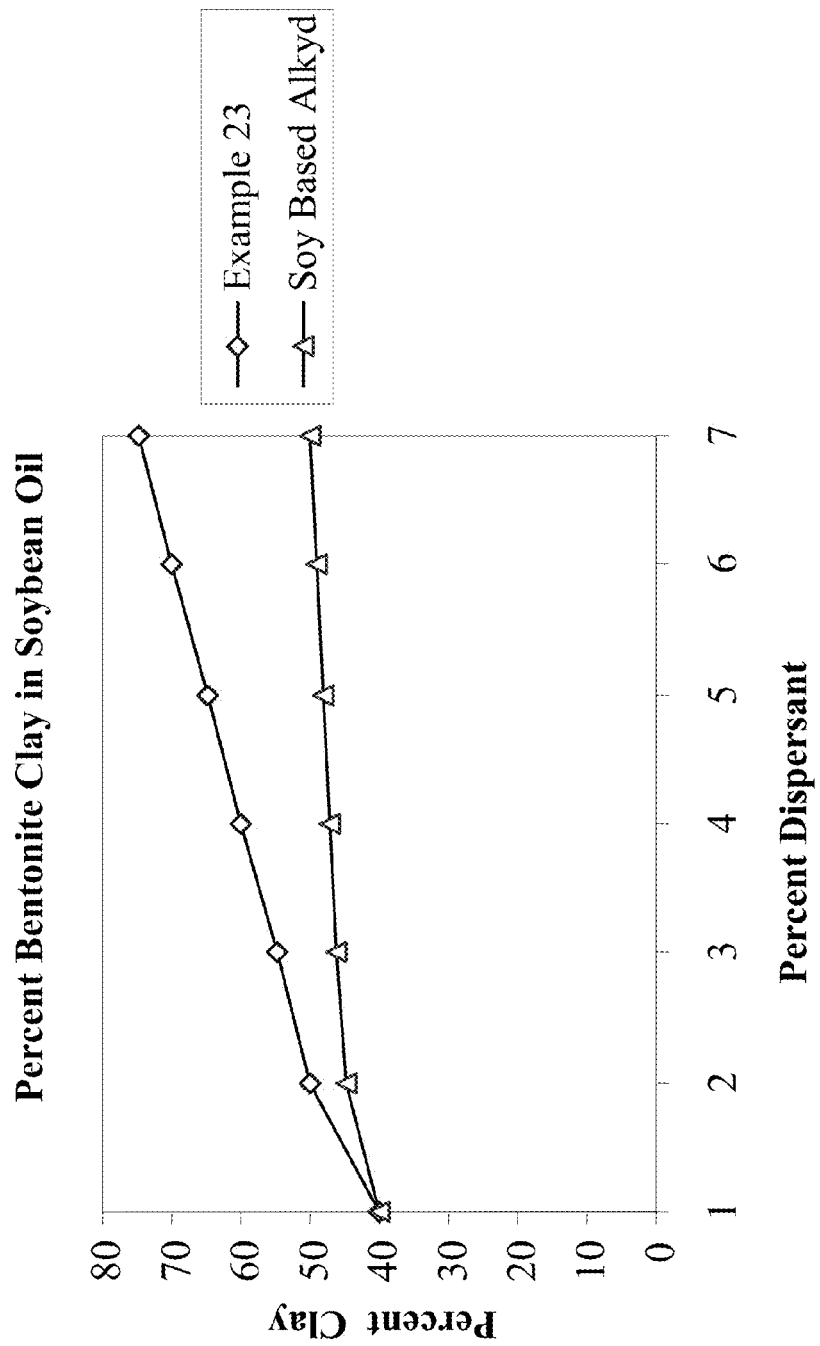
FIG. 6 features clay loadings of up to 75 percent that were achieved with a soybean oil gel of Example 23 while loadings of only 50 percent were achieved with the standard soy based alkyd resin.

A soybean oil gel as prepared in Example 23 having a viscosity of 6000 cP was utilized as a carrier or dispersant for the preparation of stable dispersions of bentonite clay in soybean oil which are utilized as fillers in heat set inks. A soy based alkyd resin, commonly used in the industry was used as a control or comparative example. As shown in FIG. 6, clay loadings of up to 75 percent were achieved with a soybean oil gel of Example 23 while loadings of only 50 percent were achieved with the standard soy based alkyd resin.

Example 47

Titanium Dioxide Dispersions

A soybean oil gel as prepared in Example 24 was utilized in the preparation of high solids Titanium Dioxide dispersions in 80/20 Isopropanol/Isopropyl acetate solvent mixture. A standard polyethylenime dispersant and a standard polycarboxylic acid dispersant known to be exemplary dispersants in the art were used as comparative examples. As shown in FIG. 7, stable pourable dispersions containing Titanium Dioxide loadings of only 50-60 percent were achieved with the comparative dispersants, whereas stable, pourable dispersions containing loadings of up to 80 percent were achieved with the soybean oil gel of Example 24.

TABLE 7

| Dispersant | Percent TiO$_2$ | Dispersion Stability$^C$ | Dispersion Viscosity (cP) |
|---|---|---|---|
| Example 24 | 70 | Excellent | 130 |
| Example 24 | 80 | Excellent | 150 |
| Polyethyleneimine based dispersant | 50 | Good d | 7000 |
| Polyethyleneimine based dispersant | 60 | Poor | Viscous Paste |
| Polyethyleneimine based dispersant | 70 | NA | Thick Paste |
| Polycarboxylic acid dispersant | 50 | Good d | 9000 |
| Polycarboxylic acid dispersant | 60 | NA | Thick Paste |

$^C$Dispersions were aged at ambient temperature for 1 month; excellent stability meaning no pigment separation or settling.
d Some pigment settling after 2 weeks Example 48

Pigment Dispersions

A soybean oil gel as prepared in Example 23 was utilized in the preparation of dispersions of various pigments in an unsaturated polyester resin. A carboxylic acid alkylammonium salt based dispersant, known as an exemplary dispersant in the art, was used for comparative purposes. As shown in Table 8, the soybean oil gel of Example 23 gave a 50% reduction in the dispersion viscosity, at the same dispersant level, as compared to the control dispersant at 30 percent pigment loadings for several pigments. The substantial reduction in viscosity of the dispersions at the same pigment loading represents a substantial improvement over the prior art and further demonstrates the usefulness of the natural oil based gels of the present invention.

TABLE 8

| Dispersant | Pigment | Percent Viscosity Reduction |
|---|---|---|
| Example 23 | Yellow 83 | 50 |
| Example 23 | Red 48:2 | 50 |
| Example 23 | Black 330 | 50 |
| Alkylammonium Carboxylate dispersant | Red 48:2 | 0 |
| Alkylammonium Carboxylate dispersant | Yellow 83 | 0 |
| Alkylammonium Carboxylate dispersant | Black 83 | 0 |

Example 49

Stable Guar Suspensions

Soybean oil gels as prepared in Example 2 and 24 were used as a carriers for the preparation of stable guar suspensions which are used in hydraulic fracturing of oil and gas wells. Suspensions of guar were made at 40% solids and compared to 40% solid suspensions using mineral oil as the carrier and hydrophobic clays as a viscosifying agent. The suspensions based on the gelled soybean oil showed identical and in some cased superior stability as measured by the amount of guar settling over time. The soybean oil gel suspensions have the added advantage of being environmentally acceptable and require no clay viscosifying additive.

Example 50

Oil Based Drilling Fluid

Soybean oil gels as prepared in Examples 2 and 24 were used as a carrier for the preparation of stable oil based drilling fluids. Drilling fluids containing 40-50% by weight of barite were made by mixing of the barite and gelled soybean oil without the use of clay thickeners. Control drilling fluids were made using conventional carriers such as kerosene along with clay visosifying agents. The drilling fluids based on the gelled soybean oil showed identical and in some cased improved stability and flow properties compared to the controls. The soybean oil based drilling fluids have the added advantages of being environmentally friendly and require no clay viscosifying additive.

The content of all references cited in the instant specifications and all cited references in each of those references are incorporated in their entirety by reference herein as if those references were denoted in the text While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

This Application was filed on Feb. 25, 2013, by Isaac A. Angres, Reg. No. 29,765.

What is claimed is:

1. An anhydrous natural oil based thermoreversible ionomeric gel selected from the group consisting of Formulas (i), (ii), (iii) and (iv), and mixtures thereof;

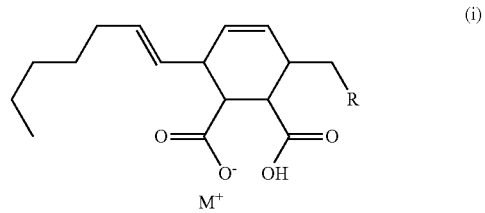

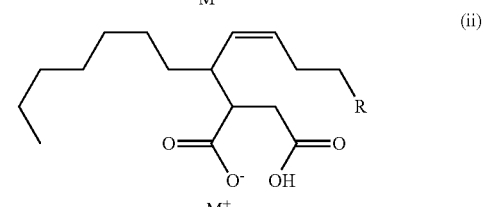

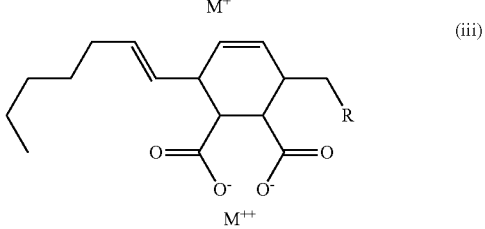

-continued

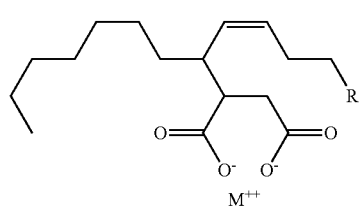
(iv)

where R represents the carbon and functional moieties from a natural oil after undergoing the ene or Diels Alder reaction; wherein said natural oil is selected from the group consisting of soybean oil, linseed oil, safflower oil, sunflower oil, avocado oil, rapeseed oil, castor oil, tall oil, rosin oil and tung oil; M is selected from the group consisting of alkali and alkaline earth metals; wherein the natural oil contains greater than about 80 percent of unsaturated or conjugated unsaturated fatty acids that have been reacted with a maleic anhydride substrate capable of undergoing an ene or Diels Alder reaction to form an adduct; said adduct being subjected to a reaction with an alkali or alkaline earth metal hydroxide or alkali or alkaline earth metal carbonate base to form the anhydrous thermoreversible ionomeric gel.

2. An ink vehicle comprising the thermoreversible gel of claim 1.

3. A dispersant comprising the thermoreversible gel of claim 1.

4. The thermoreversible gel of claim 1 as a carrier and an additive in oilfield applications.

5. The thermoreversible gel of claim 1 as a thickener and an additive in drilling fluids.

6. A natural oil based thermoreversible ionomeric gel selected from the group consisting of Formulas (v), (vi), (vii) and (viii) and mixtures thereof;

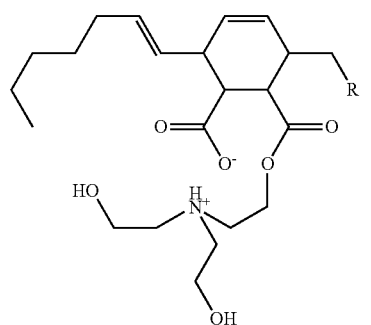
(v)

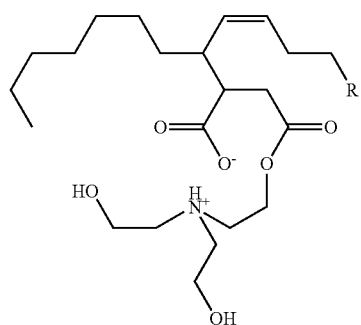
(vi)

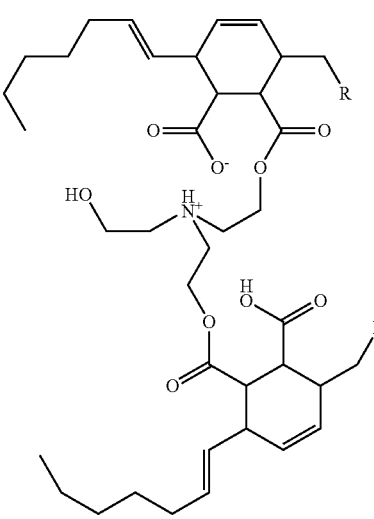
(vii)

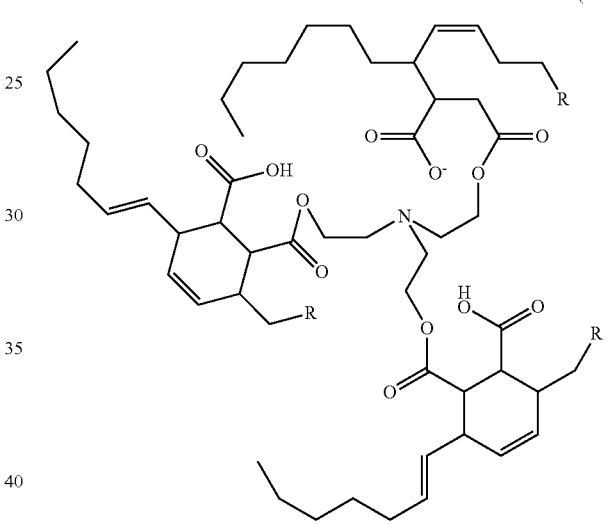
(viii)

where R represents the carbon and functional moieties from a natural oil after undergoing the ene or Diels Alder reaction; wherein said natural oil is selected from the group consisting of soybean oil, linseed oil, safflower oil, sunflower oil, avocado oil, rapeseed oil, castor oil, tall oil, rosin oil and tung oil; where the natural oil contains greater than about 80 percent of unsaturated or conjugated unsaturated fatty acids that have been reacted with a maleic anhydride substrate capable of undergoing an ene or Diels Alder reaction to form an adduct that is further esterified and neutralized with triethanolamine or an alkoxylated triethanolamine to form the thermoreversible ionomeric gel.

7. An ink vehicle comprising the thermoreversible gel of claim 6.

8. A dispersant comprising the thermoreversible gel of claim 6.

9. The thermoreversible gel of claim 6 as a carrier and an additive in oilfield applications.

10. The thermoreversible gel of claim 6, as a thickener and an additive in drilling fluids.

11. A method for providing the thermoreversible gel of claim 1; said method comprising:
(a) reacting the natural oil with a maleic anhydride substrate that is capable of undergoing an "ene" or Diels Alder reaction with said natural oil to form an adduct wherein said natural oil is selected from the group consisting of soybean oil, linseed oil, safflower oil, avocado oil, rapeseed oil, castor oil, tall oil, rosin oil and tung oil; and (b) subjecting said adduct to a controlled non-aqueous neutralization with a suitable inorganic base selected from the group consisting of alkali or alkaline earth metal hydroxide or alkali or alkaline earth metal carbonate, where the neutralization is carried out with less than the theoretical stoichimetric amount of base required for complete neutralization.

12. A method for providing the thermoreversible gel of claim 6, said method comprising:

(a) reacting the natural oil with a maleic anhydride substrate that is capable of undergoing an "ene" or Diels Alder reaction with said natural oil to form an adduct wherein said natural oil is selected from the group consisting of soybean oil, linseed oil, safflower oil, avocado oil, rapeseed oil, castor oil, tall oil, rosin oil and tung oil; and (b) subjecting said adduct to a controlled esterification/neutralization reaction with a triethanolamine or alkoxylated triethanolamine where the amount of triethanolamine or alkoxylated triethanolamine reacted is less than the theoretical stoichimetric amount required for complete reaction.

\* \* \* \* \*